(12) United States Patent
Hwang

(10) Patent No.: US 8,376,890 B2
(45) Date of Patent: Feb. 19, 2013

(54) GEAR TRAIN OF AUTOMATIC TRANSMISSION FOR VEHICLES

(75) Inventor: Seong Wook Hwang, Seoul (KR)

(73) Assignee: Hyundai Motor Company, Seoul (KR)

( * ) Notice: Subject to any disclaimer, the term of this patent is extended or adjusted under 35 U.S.C. 154(b) by 175 days.

(21) Appl. No.: 12/957,025

(22) Filed: Nov. 30, 2010

(65) Prior Publication Data

US 2012/0053003 A1   Mar. 1, 2012

(30) Foreign Application Priority Data

Sep. 1, 2010  (KR) .................. 10-2010-0085679

(51) Int. Cl.
*F16H 37/02*  (2006.01)

(52) U.S. Cl. ...................................... 475/219

(58) Field of Classification Search .............. 475/219
See application file for complete search history.

(56) References Cited

U.S. PATENT DOCUMENTS

2006/0142111 A1* 6/2006 Park .............................. 475/269

* cited by examiner

*Primary Examiner* — David D Le
*Assistant Examiner* — Erin D Bishop
(74) *Attorney, Agent, or Firm* — Morgan, Lewis & Bockius LLP

(57) ABSTRACT

A gear train of an automatic transmission for a vehicle may include first and second planetary gear sets arranged on a first shaft, a third planetary gear set arranged on a second shaft, which may be parallel to the first shaft and connected to the first and second planetary gear sets through first and second transfer gears, and a plurality of friction members, and the gear train of an automatic transmission for a vehicle realizes eighth forward speeds and one reverse speeds.

4 Claims, 3 Drawing Sheets

FIG.2

| | C1 | C2 | C3 | C4 | B1 | B2 |
|---|---|---|---|---|---|---|
| D1 | ● | | | | ● | |
| D2 | ● | | | | | ● |
| D3 | ● | ● | | | | |
| D4 | ● | | | ● | | |
| D5 | ● | | ● | | | |
| D6 | | | ● | ● | | |
| D7 | | ● | ● | | | |
| D8 | | | ● | | | ● |
| REV | | ● | | | ● | |

GEAR TRAIN OF AUTOMATIC TRANSMISSION FOR VEHICLES

CROSS-REFERENCE TO RELATED APPLICATION

The present application claims priority to Korean Patent Application No. 10-2010-0085679 filed in the Korean Intellectual Property Office on Sep. 1, 2010, the entire contents of which is incorporated herein for all purposes by this reference.

BACKGROUND OF THE INVENTION

1. Field of the Invention

The present invention relates to a power train of an automatic transmission, and more particularly, to a power train that realizes eight forward speeds and one reverse speed.

2. Description of Related Art

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and performance. For that reason, an automatic transmission that enables more shift speeds is under constant investigation.

In addition, with the same number of speeds, features of a power train, such as durability, efficiency in power transmission, and size, depend a lot on the layout of combined planetary gear sets. Therefore, designs for a combining structure of a power train are also under constant investigation.

A manual transmission that has too many speeds causes the inconvenience of excessively frequent shifting operations to a driver. Therefore, the positive features of more shift-speeds are more important for automatic transmissions because an automatic transmission automatically controls shifting operations without needing any manual operation.

In addition to various developments regarding four and five speed gear trains, gear trains of automatic transmissions realizing six forward speeds and one reverse speed have been introduced, and also, gear trains realizing more number of speeds are under investigation.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for a vehicle having advantages of an enhanced power delivery performance and an improved fuel consumption by enabling eight forward speeds and one reverse speed by combining two simple planetary gear sets and one compound planetary gear set using four clutches and two brakes.

In an aspect of the present invention, the gear train of an automatic transmission for a vehicle may include first and second planetary gear sets arranged on a first shaft, a third planetary gear set arranged on a second shaft, which may be parallel to the first shaft and connected to the first and second planetary gear sets through first and second transfer gears and a plurality of friction members, wherein the first planetary gear set may include a first sun gear that always acts as a fixed element, a first ring gear that acts as a reduced speed output element, and a first planet carrier that may be connected to an input shaft and always acts as an input element and an output element, the second planetary gear set may include a second sun gear that may be connected to the first ring gear and always acts as an input element, a second planet carrier that may be selectively connected to the input shaft and selectively connected to a transmission housing and selectively acts as an input element, a fixed element, and a output element, and a second ring gear that selectively acts as an output element and a fixed element, and the third planetary gear set may include a third sun gear that may be selectively connected to the first ring gear, the first planet carrier, the second ring gear or the transmission housing, and selectively acts as an input element and a fixed element, a third ring gear that may be connected to the second planet carrier and selectively acts as an input element and a fixed element, and a third planet carrier that acts as an output element.

The first planetary gear set may be a double pinion planetary gear set, the second planetary gear set may be a single pinion planetary gear set, and the third planetary gear set may be a double pinion planetary gear set.

The first transfer gear may be connected to the third sun gear and selectively connected to the first planet carrier, the first ring gear and the second ring gear, the second transfer gear may be connected to the third ring gear and the second planet carrier, and selectively connected to the input shaft, and the friction element may include a first clutch that selectively connects the second ring gear and the first transfer gear, a second clutch that selectively connects the first ring gear and the first transfer gear, a third clutch that selectively connects the input shaft and the second transfer gear, a fourth clutch that selectively connects the first planet carrier and the first transfer gear, a first brake that selectively connects the second planet carrier and the transmission housing, and a second brake that selectively connects the first transfer gear and the transmission housing.

The first clutch and the first brake may be operated in a first forward speed, the first clutch and the second brake may be operated in a second forward speed, the first and second clutches may be operated in a third forward speed, the first and fourth clutches may be operated in a fourth forward speed, the first and third clutches may be operated in a fifth forward speed, the third and fourth clutches may be operated in a sixth forward speed, the second and third clutches may be operated in a seventh forward speed, the third clutch and the second brake may be operated in an eighth forward speed, and the second clutch and the first brake may be operated in a reverse speed.

The first sun gear may be connected to the transmission housing.

According to an exemplary embodiment of the present invention, power delivery performance may be enhanced and fuel consumption may be improved by enabling eight forward speeds and one reverse speed by combining two simple planetary gear sets and one compound planetary gear set using four clutches and two brakes.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart of frictional elements of a gear train according to the exemplary embodiment of the present invention.

Figure 1:
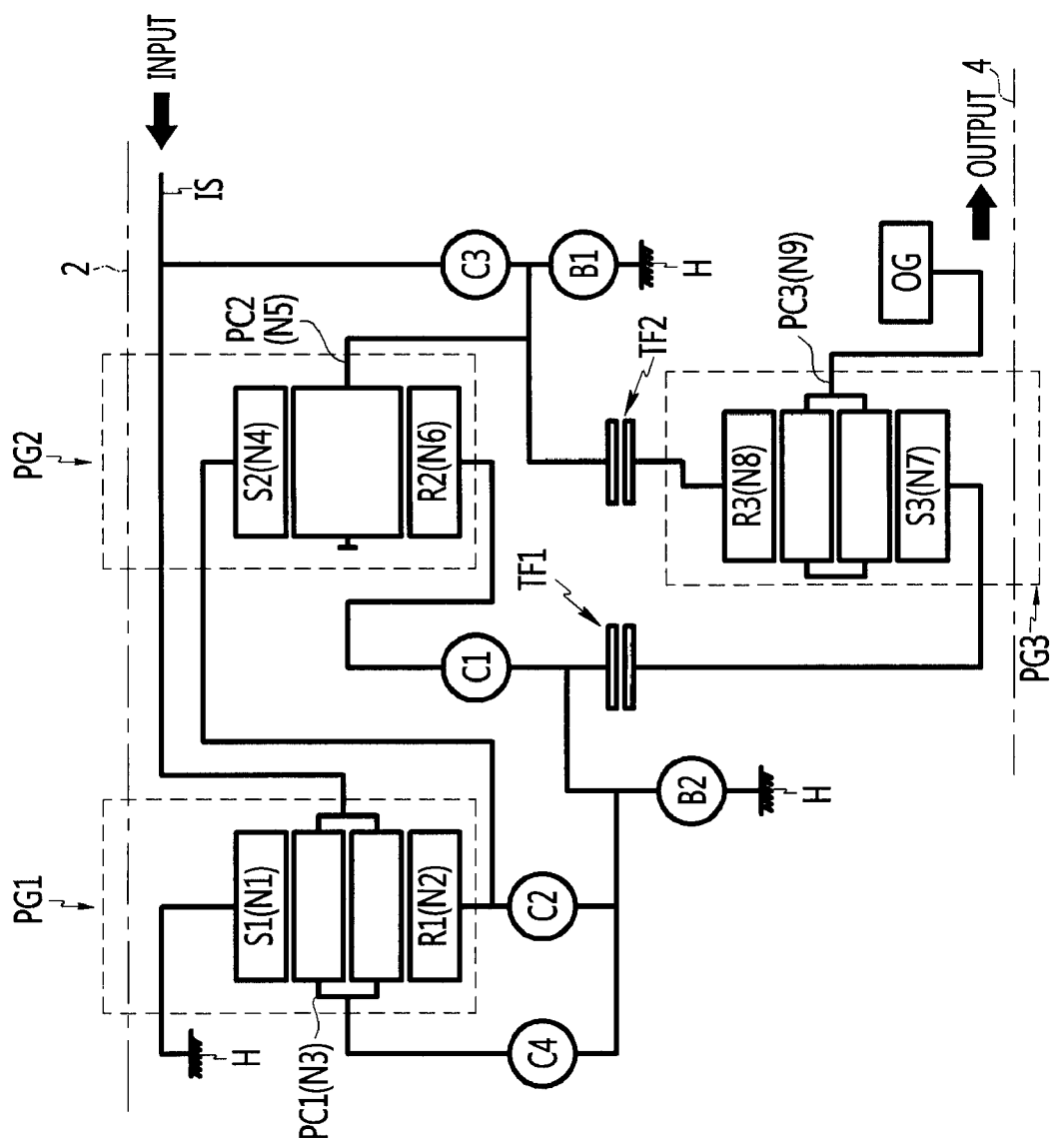
FIG. 1 is a schematic diagram of a gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

FIG. 1 is a schematic diagram of a gear train according to an exemplary embodiment of the present invention. As shown in FIG. 1, a gear train of an automatic transmission for a vehicle according to an exemplary embodiment of the present invention includes first and second planetary gear sets PG1 and PG2 arranged on a first shaft 2, a third planetary gear set PG3 arranged on a second shaft 4, which is parallel to the first shaft 2 and clutch elements including first, second, third and fourth clutches C1, C2, C3 and C4, and brake elements including first and second brakes B1 and B2.

The second planetary gear set PG2 is arranged toward an engine and, the third planetary gear set PG3 is arranged parallel to the first and second planetary gear sets PG1 and PG2.

Torque delivered from the input shaft IS is delivered to the third planetary gear set PG3 through the first and second planetary gear sets PG1 and PG2 and two transfer gears TF1 and TF2, shifted, and then output eight forward speeds and one reverse speed through an output gear OG.

The input shaft IS may mean a turbine shaft of a torque converter as an input element and the output gear OG drives a differential apparatus as an output member.

The first planetary gear set PG1 is a double pinion planetary gear set, and include a sun gear, a planet carrier, a ring gear, for convenience of explanation, those are called the first sun gear S1, the first planet carrier PC1, and the first ring gear R1.

The second planetary gear set PG2 is a single pinion planetary gear set, and includes a sun gear, a planet carrier, a ring gear, for convenience of explanation, those are called the second sun gear S2, the second planet carrier PC2, and the second ring gear R2.

The third planetary gear set PG3 is a double pinion planetary gear set, and include a sun gear, a planet carrier, a ring gear, for convenience of explanation, those are called the third sun gear S3, the third planet carrier PC3, and the third ring gear R3.

The first sun gear 51 is fixed to a transmission housing H and the first planet carrier PC1 is directly connected to the input shaft IS.

The first sun gear S1 is connected to the transmission housing H and always acts as a fixed element. The first planet carrier PC1 is connected to the input shaft IS and always acts as an input element, and selectively connected to the first transfer gear TF1. The first ring gear R1 acting as an output element is directly connected to the second sun gear S2 and selectively connected to the first transfer gear TF1.

The second sun gear S2 is directly connected to the first ring gear R1 acting as an input element. The second planet carrier PC2 is directly connected to the second transfer gear TF2 acting as an output element, and selectively connected to the input shaft IS and the transmission housing H acting as an input element or a fixed element. The second ring gear R2 is selectively connected to the first transfer gear TF1 acting as an output element, and selectively connected to the transmission housing H acting as a fixed element.

The first clutch C1 is disposed between the second ring gear R2 and the first transfer gear TF1, the second clutch C2 is disposed between the first ring gear R1 and the first transfer gear TF1, the third clutch C3 is disposed between input shaft IS and the second planet carrier PC2, and the fourth clutch C4 is disposed between the first planet carrier PC1 and the first transfer gear TF1.

The first brake B1 is disposed between the second planet carrier PC2 and the transmission housing H, and the second brake B2 is disposed between the first transfer gear TF1 and the transmission housing H.

Figure 2:
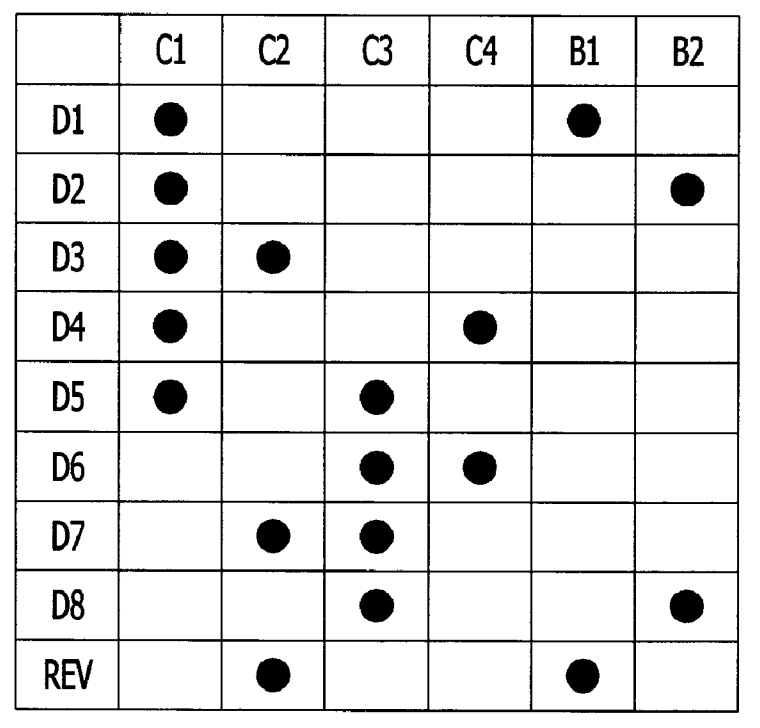

FIG. 2 is an operational chart of frictional elements of a gear train according to the exemplary embodiment of the present invention. As shown in FIG. 2, two friction elements are operated in each shift speeds.

That is, the first clutch C1 and the first brake B1 are operated in a first forward speed, the first clutch C1 and the second brake B2 are operated in a second forward speed, the first and second clutches C1 and C2 are operated in a third forward speed, the first and fourth clutches C1 and C4 are operated in a fourth forward speed, the first and third clutches C1 and C3 are operated in a fifth forward speed, the third and fourth clutches C3 and C4 are operated in a sixth forward speed, the second and third clutches C2 and C3 are operated in a seventh forward speed, the third clutch C3 and the second brake B2 are operated in a eighth forward speed, and the second clutch C2 and the first brake B1 are operated in a reverse speed.

Figure 3:
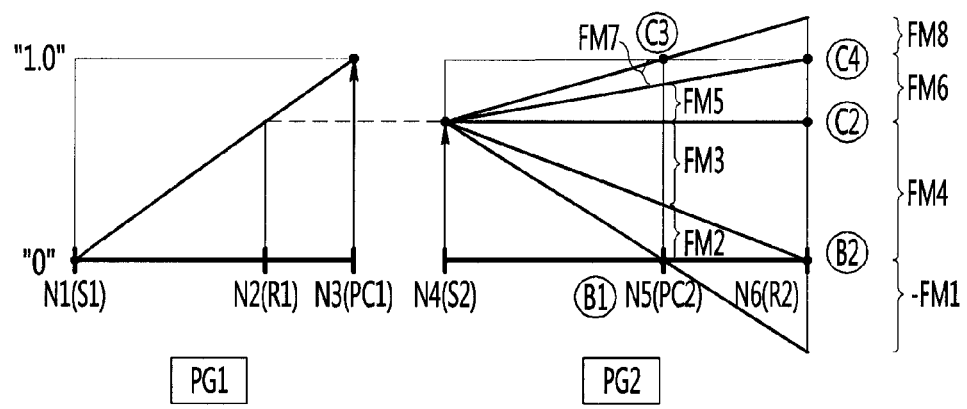
FIG. 3 is a speed diagram according to the exemplary embodiment of the present invention.
Figure 3:
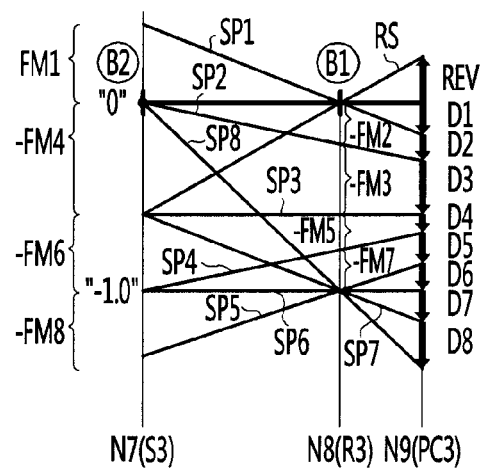

FIG. 3 is a speed diagram according to the exemplary embodiment of the present invention. A lower horizontal line marked with "0" denotes a zero(0) rotation speed, and an upper horizontal line marked with "1" denotes the input speed, i.e., the same speed with the input shaft IS.

Three vertical lines of the first planetary gear set PG1 corresponds to, sequentially from the left to the right, the first operational element N1 of the first sun gear S1, the second operational element N2 of the first ring gear R1, and the third operational element N3 of the first planet carrier PC1. The horizontal spacing between the three vertical lines depends on a sun gear/ring gear teeth ratio of the first planetary gear set PG1.

In addition, three vertical lines of the second planetary gear set PG2 corresponds to, sequentially from the left to the right, the fourth operational element N4 of the second sun gear S2, the fifth operational element N5 of the second planet carrier PC2, and the sixth operational element N6 of the second ring gear R2. The horizontal spacing between the three vertical lines depends on a sun gear/ring gear teeth ratio of the second planetary gear set PG2.

Also, three vertical lines of the third planetary gear set PG3 corresponds to, sequentially from the left to the right, the seventh operational element N7 of the third sun gear S3, the eighth operational element N8 of the third ring gear R3, and the ninth operational element N9 of the third planet carrier PC3. The horizontal spacing between the three vertical lines depends on a sun gear/ring gear teeth ratio of the third planetary gear set PG3.

Forming such a shift diagram is obvious to a person of an ordinary skill in the art, and is not described in further detail.

In the FIG. 3, negative sign "–" means that rotating direction is opposite to rotating direction of the engine. Since the third planetary gear set PG3 is externally gear-meshed with the first and second planetary gear sets PG1 and PG2 through the first and second transfer gears TF1 and TF2 without an idling gear, the third planetary gear set PG3 rotates opposite to rotating direction of the engine.

And thus, if it is required that rotating direction of the output gear OG has to be changed, it may be changed and delivered to a differential apparatus.

<First Forward Speed>

Since the first sun gear S1 of the first planetary gear set PG1 is connected to the transmission housing H acting as a fixed element, and the first planet carrier PC1 acts as an input element, and thus the first ring gear R1 outputs reduced rotational speed.

As shown in FIG. 2, the first clutch C1 and the first brake B1 are operated in the first forward speed.

In the second planetary gear set PG2, the second sun gear S2 acts as an input element, and the second planet carrier PC2 acts as a fixed element by operation of the first brake B1, and thus the second ring gear R2 outputs reversed speed as –FM1.

In the third planetary gear set PG3, the third ring gear R3 is connected to the second planet carrier PC2 through the second transfer gear TF2 and acts as a fixed element, and the third sun gear S3 receives rotational speed FM1 by operation of the first clutch C1. Therefore, a first forward speed line SP1 is formed by the third planetary gear set PG3. Now, the final output speed of the gear train becomes a height D1 of the first forward speed line SP1 at the position of the ninth operational element N9, and thus the first forward speed is realized.

<Second Forward Speed>

At the second forward speed, the first brake B1 that operated at the first forward speed is released, and the second brake B2 is controlled to operate.

In this case, the second ring gear R2 is operated as a fixed element by operation of the second brake B2 while the second sun gear S2 acts as an input element, and thus the second planet carrier PC2 outputs reduced rotational speed as FM2.

In the third planetary gear set PG3, the third sun gear S3 is connected to the second ring gear R2 through the first transfer gear TF1 by operation of the first clutch C1 and acts as a fixed element, and the third ring gear R3 receives reversed rotational speed as –FM2. Therefore, a second forward speed line SP2 is formed by the third planetary gear set PG3. Now, the final output speed of the gear train becomes a height D2 of the second forward speed line SP2 at the position of the ninth operational element N9, and thus the second forward speed is realized.

<Third Forward Speed>

At the third forward speed, as shown in FIG. 2, the second brake B2 that operated at the second forward speed is released, and the second clutch C2 is controlled to operate.

In this case, since the second sun gear S2 receives rotational speed and the second sun gear S2 receives the same rotational speed, and thus the second planetary gear set PG2 integrally rotates. So the second planet carrier PC2 outputs rotational speed as FM3 and the second ring gear R2 outputs rotational speed as FM4.

In the third planetary gear set PG3, the third sun gear S3 receives reversed rotational speed as –FM4 through the first transfer gear TF1 and the first clutch C1 and the third ring gear R3 receives reversed rotational speed as –FM3. Therefore, a third forward speed line SP3 is formed by the third planetary gear set PG3. Now, the final output speed of the gear train becomes a height D3 of the third forward speed line SP3 at the position of the ninth operational element N9, and thus the third forward speed is realized.

<Fourth Forward Speed>

At the fourth forward speed, as shown in FIG. 2, the second clutch C2 that operated at the third forward speed is released and the fourth clutch C4 is controlled to operate.

In the second planetary gear set PG2, the second sun gear S2 receives rotational speed of the first ring gear R1, and the second ring gear R2 receives rotational speed of the input shaft IS by operations of the fourth clutch C4 and the first clutch C1 to output rotational speed as FM6. And thus the second planet carrier PC2 outputs rotational speed as FM5.

In the third planetary gear set PG3, the third sun gear S3 receives reversed rotational speed as –FM6 through the first transfer gear TF1 and the first clutch C1 and the third ring gear R3 receives reversed speed as –FM5. Therefore, a fourth forward speed line SP4 is formed by the third planetary gear set PG3. Now, the final output speed of the gear train becomes a height D4 of the fourth forward speed line SP4 at the position of the ninth operational element N9, and thus the third forward speed is realized.

<Fifth Forward Speed>

In the fifth forward speed, as shown in FIG. 2, the fourth clutch C4 that operated at the fourth forward speed is released, and the third clutch C3 is controlled to operate.

In the second planetary gear set PG2, the second sun gear S2 receives rotational speed of the first ring gear R1, the second planet carrier PC2 receives rotational speed of the input shaft IS through the third clutch C3 to output rotational speed as FM7, and the second ring gear PC2 outputs rotational speed as FM8.

In the third planetary gear set PG3, the third sun gear S3 receives reversed rotational speed as –FM8 through the first transfer gear TF1 and the first clutch C1, and the third ring gear R3 receives reversed speed as –FM7. Therefore, a fifth forward speed line SP5 is formed by the third planetary gear set PG3. Now, the final output speed of the gear train becomes a height D5 of the fourth forward speed line SP5 at the position of the ninth operational element N9, and thus the fifth forward speed is realized.

<Sixth Forward Speed>

In the sixth forward speed, as shown in FIG. 2, the first clutch C1 that operated at the fifth forward speed is released, and the fourth clutch C4 is controlled to operate.

The rotational speed of the input shaft IS is delivered to the third ring gear R3 through the third clutch C3 and the second transfer gear TF2, the rotational speed of the first planet carrier PC1 is delivered to the third sun gear S3 through the first transfer gear TF1. Therefore, the third planetary gear set PG3 integrally rotates and a sixth forward speed line SP6 is formed by the third planetary gear set PG3. Now, the final output speed of the gear train becomes a height D6 of the sixth forward speed line SP6 at the position of the ninth operational element N9, and thus the sixth forward speed is realized.

<Seventh Forward Speed>

At the seventh forward speed, as shown in FIG. 2, the fourth clutch C4 that operated at the sixth forward speed is released, and the second clutch C2 is controlled to operate.

The rotational speed of the input shaft IS is delivered to the third ring gear R3 through the third clutch C3 and the second transfer gear TF2, the rotational speed of the first ring gear R1 is delivered to the third sun gear S3 through the first transfer gear TF1. Therefore, a seventh forward speed line SP7 is formed by the third planetary gear set PG3. Now, the final output speed of the gear train becomes a height D7 of the seventh forward speed line SP7 at the position of the ninth operational element N9, and thus the seventh forward speed is realized.

<Eighth Forward Speed>

In the eighth forward speed, as shown in FIG. 2, the second clutch C2 that operated at the seventh forward speed is released, and the second brake B2 is controlled to operate.

The rotational speed of the input shaft IS is delivered to the third ring gear R3 through the third clutch C3 and the second transfer gear TF2, the third sun gear S3 acts as a fixed element by operating of the second brake B2. Therefore, a eighth forward speed line SP4 is formed by the third planetary gear set PG3. Now, the final output speed of the gear train becomes a height D8 of the eighth forward speed line SP8 at the position of the ninth operational element N9, and thus the eighth forward speed is realized.

<Reverse Speed>

In the reverse speed, as shown in FIG. 2, the second clutch C2 and the first brake B1 are controlled to operate.

The third sun gear S3 receives rotational speed of the first ring gear R1 though the second clutch C2 and the first transfer gear TF1, and the third ring gear R3 acts as a fixed element according to operation of the first brake B1. Therefore, a reverse speed line RS is formed by the third planetary gear set PG3. Now, the final output speed of the gear train becomes a height REV of the reverse speed line RS at the position of the ninth operational element N9, and thus the reverse speed is realized.

As described above, the first planetary gear set PG1 outputs reduced rotational speed and the same rotational speed of the input shaft IS, The second planetary gear set PG2 receives the rotational speed from the first planetary gear set PG1 and the input shaft IS, shifts and outputs through two paths, and the third planetary gear set PG3 receives rotational speed from the first and second planetary gear sets PG1 and PG2 and outputs eight forward speeds and one reverse speed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle comprising first and second planetary gear sets arranged on a first shaft, a third planetary gear set arranged on a second shaft that is parallel to the first shaft, and a plurality of friction members, the third planetary gear set being connected to the first and second planetary gear sets through first and second transfer gears, wherein:

the first planetary gear set comprises:
 a first sun gear that is fixedly connected to a transmission housing;
 a first ring gear that outputs a reduced speed of the first planetary gear set; and
 a first planet carrier that is fixedly connected to an input shaft and selectively connected to the first transfer gear;

the second planetary gear set comprises:
 a second sun gear that is fixedly connected to the first ring gear;
 a second planet carrier that is selectively connected to the input shaft, selectively connected to the transmission housing, and fixedly connected to the second transfer gear; and
 a second ring gear that is selectively connected to the first transfer gear;

and the third planetary gear set comprises:
 a third sun gear that is fixedly connected to the first transfer gear;
 a third ring gear that is fixedly connected to the second transfer gear; and
 a third planet carrier that acts as an output element.

2. The gear train of the automatic transmission of claim 1, wherein:
the first planetary gear set is a double pinion planetary gear set;
the second planetary gear set is a single pinion planetary gear set; and
the third planetary gear set is a double pinion planetary gear set.

3. The gear train of the automatic transmission of claim 1, wherein:
the first transfer gear is connected to the third sun gear and selectively connected to the first planet carrier, the first ring gear and the second ring gear;
the second transfer gear is connected to the third ring gear and the second planet carrier, and selectively connected to the input shaft; and
the plurality of friction members comprises:
 a first clutch that selectively connects the second ring gear and the first transfer gear;
 a second clutch that selectively connects the first ring gear and the first transfer gear;
 a third clutch that selectively connects the input shaft to the second planet carrier and the second transfer gear;
 a fourth clutch that selectively connects the first planet carrier and the first transfer gear;
 a first brake that selectively connects the second planet carrier and the second transfer gear to the transmission housing; and
 a second brake that selectively connects the first transfer gear and the transmission housing.

4. The gear train of the automatic transmission of claim 3, wherein:
the first clutch and the first brake are operated in a first forward speed;
the first clutch and the second brake are operated in a second forward speed;

the first and second clutches are operated in a third forward speed;

the first and fourth clutches are operated in a fourth forward speed;

the first and third clutches are operated in a fifth forward speed;

the third and fourth clutches are operated in a sixth forward speed;

the second and third clutches are operated in a seventh forward speed;

the third clutch and the second brake are operated in an eighth forward speed; and the second clutch and the first brake are operated in a reverse speed.

* * * * *